(12) United States Patent
Mogilevski

(10) Patent No.: US 8,502,420 B1
(45) Date of Patent: Aug. 6, 2013

(54) POWER SUPPLY ARCHITECTURE FOR CONTROLLING AND MONITORING ISOLATED OUTPUT MODULES

(75) Inventor: Igor Mogilevski, Northridge, CA (US)

(73) Assignee: Power-One, Inc., Camarillo, CA (US)

( * ) Notice: Subject to any disclaimer, the term of this patent is extended or adjusted under 35 U.S.C. 154(b) by 502 days.

(21) Appl. No.: 12/905,693

(22) Filed: Oct. 15, 2010

Related U.S. Application Data

(60) Provisional application No. 61/252,067, filed on Oct. 15, 2009.

(51) Int. Cl.
*G05F 3/06* (2006.01)

(52) U.S. Cl.
USPC .......................................................... 307/151

(58) Field of Classification Search
USPC .......................................................... 307/151
See application file for complete search history.

(56) References Cited

U.S. PATENT DOCUMENTS

| | | | |
|---|---|---|---|
| 6,771,052 B2 | 8/2004 | Ostojic | |
| 7,068,021 B2 | 6/2006 | Chapuis | |
| 7,373,527 B2 | 5/2008 | Chapuis | |
| 7,394,445 B2 | 7/2008 | Chapuis et al. | |
| 2004/0201279 A1 | 10/2004 | Templeton | |
| 2006/0279969 A1 | 12/2006 | Leung et al. | |
| 2007/0040657 A1 | 2/2007 | Fosler et al. | |
| 2008/0082716 A1 | 4/2008 | Alfano | |
| 2008/0238393 A1 | 10/2008 | Potter et al. | |

*Primary Examiner* — Robert L. Deberadinis
(74) *Attorney, Agent, or Firm* — Waddey & Patterson, P.C.; Mark J. Patterson; Gary L. Montle

(57) ABSTRACT

A modular power supply and power control system includes a digital controller coupled to each of a plurality of output modules via a single wire serial data bus having a default high logic state. A plurality of isolation transformers are each coupled on a primary side to receive an intermediate bus voltage, and further coupled on a secondary side to one of the output modules. Galvanic isolation circuits provide galvanic isolation on the serial data bus between each of the output modules and the digital controller. The digital controller further includes circuitry effective to pull a bus logic state from high to low for generating data transmission to the plurality of isolated modules. Each of the plurality of isolated modules further include circuitry effective to independently pull the bus logic state from high to low for generating data transmission to the digital controller.

20 Claims, 13 Drawing Sheets

POWER SUPPLY ARCHITECTURE FOR CONTROLLING AND MONITORING ISOLATED OUTPUT MODULES

CROSS-REFERENCES TO RELATED APPLICATIONS

This application claims benefit of the following patent application(s) which is/are hereby incorporated by reference: U.S. Provisional Application No. 61/252,067, filed on Oct. 15, 2009.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND OF THE INVENTION

The present invention relates generally to switch mode power control systems. More particularly, the present invention relates to a power supply architecture for controlling and monitoring a plurality of independent and isolated output modules such as point-of-load regulators.

Point-of-load power conversion systems have become increasingly popular for use in contemporary power supply architectures. An electronic system may commonly require power to be provided at different discrete voltage and current levels, including for example circuits which may require a relatively low voltage (e.g., 1 V) but with relatively high current (e.g., 100 A). It is generally considered undesirable to deliver relatively high current at low voltages over a relatively long distance through an electronic device, as power distribution losses may become prohibitive. For example, to maintain constant distribution efficiency the bus cross-section in typical centralized architectures may need to be increased exponentially with respect to the reduction in voltage.

Typically, an intermediate bus voltage converter may be used to provide an isolated intermediate bus voltage (e.g., 9 V) from a relatively higher nominal input voltage source (e.g., 48 V). This intermediate bus voltage may be distributed throughout the power system for further point-of-load power conversion. If the input voltage source is regulated, the intermediate bus voltage converter can be unregulated. A conventional intermediate bus voltage converter includes a transformer to provide isolation between the input and output voltages. On the output side of the transformer, synchronous rectifiers convert the periodic voltage on the transformer to a DC output voltage.

The point-of-load power conversion of the intermediate bus voltage may typically be carried out by individual point-of-load ("POL") regulators, i.e., a DC/DC converter at the point of power consumption. A power system may include a plurality of POL regulators to convert the intermediate bus voltage into each of the plurality of required power levels. Ideally, each POL regulator would be physically located adjacent the corresponding load so as to minimize the length of the low voltage, high current lines through the power system. The intermediate bus voltage can be delivered to the plurality of POL regulators using low current lines that minimize losses.

In point-of-load power conversion systems, it is further known to provide a power system controller which is adapted to activate, control and monitor the plurality of POL regulators via a multi-connection parallel bus. Such control systems often however introduce undesirable complexity and size to the overall power system.

Further, most conventional point-of-load power conversion systems provide non-isolated POL regulators, predominantly due to their lower cost. However, non-isolated POL regulators may expose loads which are particularly sensitive to over-voltage conditions, and ground loop conditions are also a potential problem for the power system as a whole.

BRIEF SUMMARY OF THE INVENTION

In accordance with the present invention, power supply systems and associated methods are provided for simplifying the digital control and monitoring of multiple isolated output modules.

Briefly stated, in an embodiment a modular power supply and control system includes a plurality of output modules each independently configured to provide regulated power to an associated load. A bidirectional communication medium is coupled to each of the plurality of output modules via one of a plurality of galvanic isolation circuits. A digital power manager is coupled to the communication medium, and includes a controller and stored instructions executable by the digital power manager to cause the controller to program operational parameters of the plurality of output modules via the communication medium and to receive monitoring data from the plurality of output modules via the communication medium. Each output module is isolated from each of the other output modules with regards to data transmission along the communication medium and further with regards to an input power provided from an intermediate power bus.

In another embodiment, a modular power supply and power control system includes a digital controller coupled to each of a plurality of output modules via a single wire serial data bus having a default high logic state. A plurality of isolation transformers are each coupled on a primary side to receive an intermediate bus voltage, and further coupled on a secondary side to one of the output modules. Galvanic isolation circuits provide galvanic isolation on the serial data bus between each of the output modules and the digital controller. The digital controller further includes circuitry effective to pull a bus logic state from high to low for generating data transmission to the plurality of isolated modules. Each of the plurality of isolated modules further include circuitry effective to independently pull the bus logic state from high to low for generating data transmission to the digital controller.

In another embodiment, a power control system includes an open loop half-bridge power converter effective to convert a nominal input voltage into an intermediate bus voltage. A plurality of isolation transformers have primary sides coupled to receive the intermediate bus voltage and secondary sides galvanically isolated from the primary sides. A plurality of power output modules are each coupled to receive an isolated voltage from one of the plurality of secondary sides of the isolation transformers, and to convert the isolated voltage into an output voltage for conveyance to an independent load. A digital power manager is coupled to each of the plurality of output modules via a serial data bus having a default high logic state. A plurality of isolation circuits provide galvanic isolation on the serial data bus between each of the output modules and the digital controller. The digital power manager is configured to pull the serial data bus low when the serial data bus is in a high logic state, and is prevented from pulling the serial data bus low when the serial data bus is in a low logic state generated by an output module. The plurality of output modules are configured to pull the serial data bus low when the serial data bus is in a high logic state, and are prevented from pulling the serial data bus low when the serial data bus is in a low logic state.

BRIEF DESCRIPTION OF THE SEVERAL VIEWS OF THE DRAWINGS

FIG. 13b is an isometric view of an embodiment of an external cable housing for a cable configured for coupling with the connector of FIG. 13a.

FIG. 14b is a front view of an embodiment of an external cable housing for a cable configured for coupling with the connector of FIG. 14a.

FIG. 15b is a frontal view of an embodiment of an external cable housing for a cable configured for coupling with the connector of FIG. 15a.

DETAILED DESCRIPTION OF THE INVENTION

Figure 1:
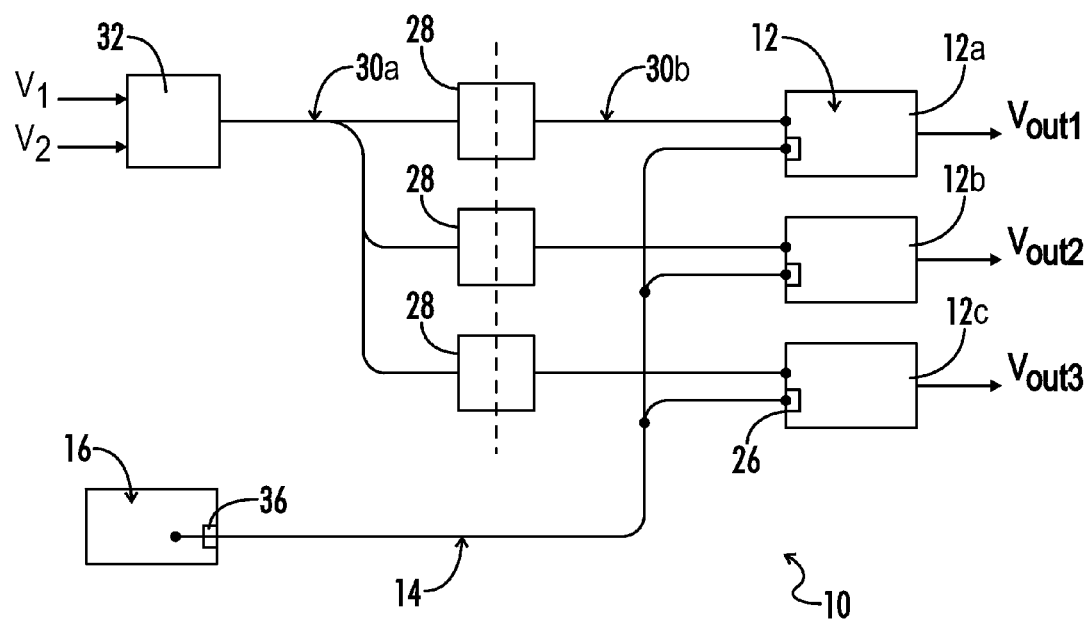
FIG. 1 is a block diagram showing an embodiment of a power supply and control system in accordance with the present invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The term "coupled" means at least either a direct electrical connection between the connected items or an indirect connection through one or more passive or active intermediary devices.

The term "circuit" means at least either a single component or a multiplicity of components, either active and/or passive, that are coupled together to provide a desired function.

The term "isolation circuit" as used herein may unless otherwise stated generally refer to at least: an opto-isolator, optical isolator, photocoupler, opto-coupler, photoMOS and various equivalent alternatives as known in the art to provide galvanic isolation between elements of a circuit.

The term "signal" means at least one current, voltage, charge, temperature, data or other signal.

The terms "switching element" and "switch" may be used interchangeably and may refer herein to at least: a variety of transistors as known in the art (including but not limited to FET, BJT, IGBT, JFET, etc.), a switching diode, a silicon controlled rectifier (SCR), a diode for alternating current (DIAC), a triode for alternating current (TRIAC), a mechanical single pole/double pole switch (SPDT), or electrical, solid state or reed relays. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

The terms "power converter" and "converter" unless otherwise defined with respect to a particular element may be used interchangeably herein and with reference to at least DC-DC, DC-AC, AC-DC, buck, buck-boost, boost, half-bridge, full-bridge, H-bridge or various other forms of power conversion or inversion as known to one of skill in the art.

The term "controller" as used herein may refer to at least a general microprocessor, an application specific integrated circuit (ASIC), a digital signal processor (DSP), a microcontroller, a field programmable gate array, or various alternative blocks of discrete circuitry as known in the art, designed to perform functions as further defined herein.

The term "POL regulators" as used herein may refer to at least point-of-load regulators, power-on-load regulators, DC/DC converters, voltage regulators, and all other programmable voltage or current regulating devices as known to one of skill in the art.

Referring generally to FIGS. 1-16, various embodiments of power supply systems and associated methods for simplifying the digital control and monitoring of multiple isolated output modules may be herein described in greater detail. Where the various figures may describe embodiments sharing various common elements and features with other embodiments, similar elements and features are given the same reference numerals and redundant description thereof may be omitted below.

Referring first to FIG. 1, in one embodiment a power supply and control system 10 in accordance with the present invention may include a plurality of independent and isolated output modules 12 arranged to provide output voltages Vout to associated loads. In various embodiments, the output modules 12 may be referred to as POL regulators 12 as known in the art of distributed power generation systems, but the output modules 12 may refer more generally to buck converters without any implied limitation as to the positioning of the output modules 12 with respect to an associated load.

The three output modules 12a, 12b, 12c shown in FIG. 1 (or for example the two output modules 12a, 12b shown in FIG. 2) are labeled as such with respect to the particular example given, but additional output modules 12d . . . 12x may be anticipated within the scope of the present invention, and various descriptions of the system 10 may refer to the output modules individually as 12a, 12b, etc. or collectively as output module(s) 12. Each output module 12 within the scope of the present invention may be described interchangeably with respect to each other output module 12, unless otherwise stated herein, with respect to their communications protocol and hardware configuration. It may be understood, however, that the output modules 12 are not necessarily limited to identical configurations with respect to, for example, power regulating functions where a particular output module 12a may be configured to provide an output voltage of a first power value and another output module 12b may be configured to provide an equivalent output voltage with a second power value, or for example where various output modules 12 provide equivalent power value outputs but with separate voltage values Vout1, Vout2, . . . Voutx.

Each output module 12 is collectively coupled to a digital controller 16 via a bidirectional communications medium 14, and further coupled to the bidirectional communications medium 14 via a first isolation circuit 26 which is arranged to provide galvanic isolation between the digital controller 16 and the associated output module 12, as well as between any given output module 12 (for example output module 12a) and each of the other provided output modules 12 (for example output modules 12b, 12c) along the bidirectional communications medium 14. The output modules 12 are further coupled to an intermediate power bus 30 via a second isolation circuit 28 which provides galvanic isolation between an intermediate power converter 32 and the output modules 12. A first portion of the intermediate power bus 30a is coupled between the converter 32 and each of the second isolation circuits 28, and a second (isolated) portion of the bus 30b is coupled between each of the second isolation circuits 28 and the associated output module 12.

In various embodiments, the converter 32 may be an open loop half-bridge converter 32 which may be unregulated where the output modules 12 are tightly regulated, and wherein no need exists for a control loop to be provided across the galvanic isolation barrier. One or more synchronous rectifiers may be provided within the scope of the converter 32 itself for performing synchronous rectification on the output voltage $V_{BUS1}$ from the converter 32 to the intermediate bus 30a as further described below, or may in various alternative embodiments as further described below be provided on a secondary side of each of the second isolation circuits 28 for providing independent synchronous rectification of an input bus voltage to associated output modules 12. Where synchronous rectification is performed in the secondary side of each of the second isolation circuits 28, it may be understood that in various embodiments the isolated input signal provided to each associated output module 12 may therefore vary and is not limited to the output provided from the converter 32.

In various embodiments (not shown), the second isolation circuits 28 as described below with reference to FIG. 4 may be omitted altogether where galvanic isolation and synchronous rectification of the intermediate bus voltage is performed entirely within the scope of the power converter 32. Alternatively, in such embodiments one or more load circuits 724 of the power converter 32 as described below with reference to FIG. 7 may instead be referred to as the second isolation circuits 28.

The bidirectional communications medium 14 in various embodiments may be a single-wire serial data (SD) bus 14 which is effective to provide synchronous data transmission between the digital controller 16 and the plurality of output modules 12, such as, for example, where the data transmission is synchronized to a clock signal generated by the digital controller 16. Alternatively, the bidirectional communications medium may within the scope of the present invention be a dual-wire serial bus 14 such as, for example, an $I^2C$ bus that allows asynchronous data transmission. The bidirectional communications medium 14 in either case may in various embodiments be provided with a default high logic state, or alternatively stated may be coupled to circuitry effective to generate a high logic state for the communications medium 14 in the absence of a low logic state generated by any of the output modules 12 or the digital controller 16.

The first isolation circuits 26 associated with the output modules may in various embodiments be configured to generate a low logic state on the communications medium 14 when a high logic state is detected and when data transmission to the digital controller 16 is required or requested. The first isolation circuits 26 may further be configured to prevent a low logic state from being generated when a low logic state is already detected as being present on the communications medium 14, for example where a low logic state has been generated by another output module 12 or by the digital controller 16 for data transmission from another device.

Likewise, the digital controller 16 may include or be otherwise associated with data communications circuitry 24 which in various embodiments is configured to generate a low logic state on the communications medium 14 when a high logic state is detected and when data transmission to one or more of the output modules 12 is intended. The circuitry 24 may further be configured to prevent a low logic state from being generated when a low logic state is already detected as being present on the communications medium 14, for example where a low logic state has been generated by an output module 12 for data transmission to the digital controller 16.

Figure 2:
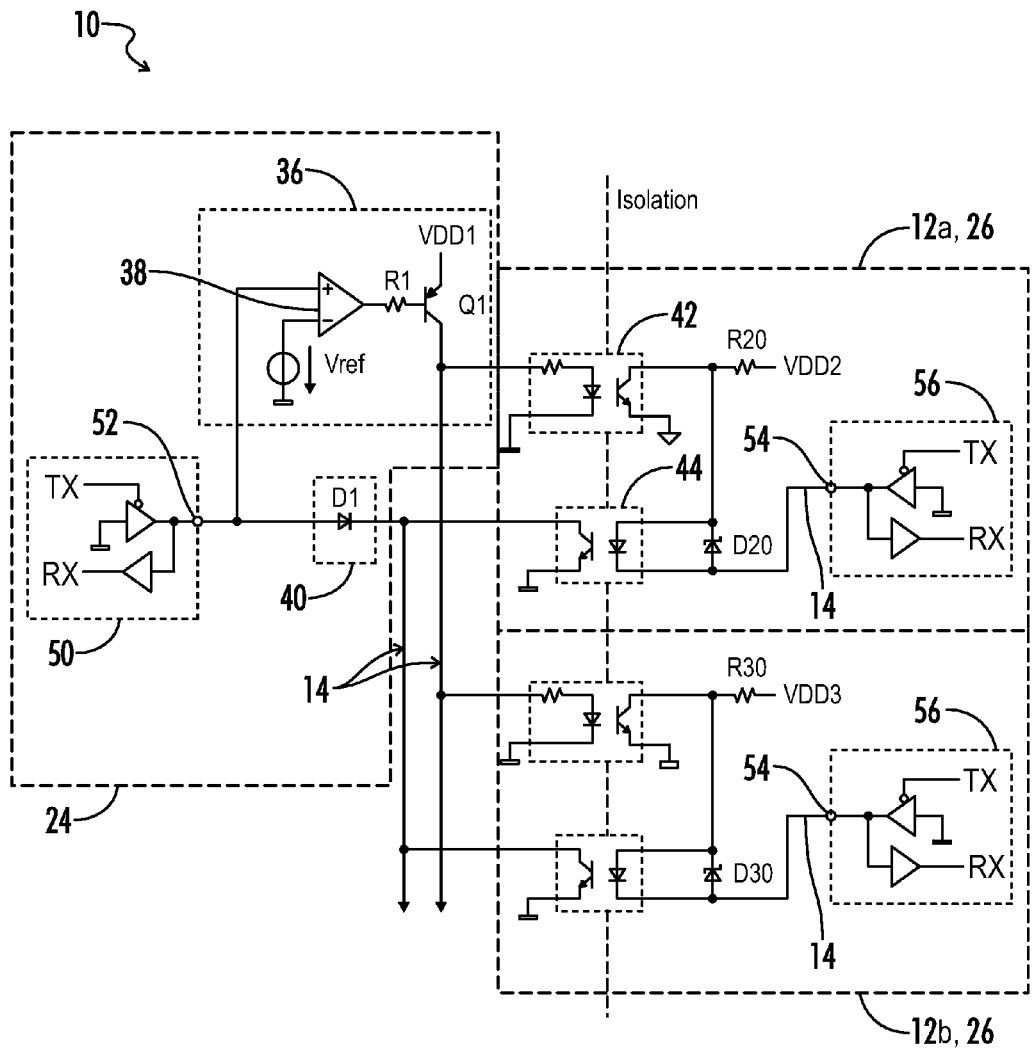
FIG. 2 is a block diagram showing an embodiment of a bidirectional communications protocol between a digital controller and various output modules in accordance with the system of FIG. 1.
Figure 3A:
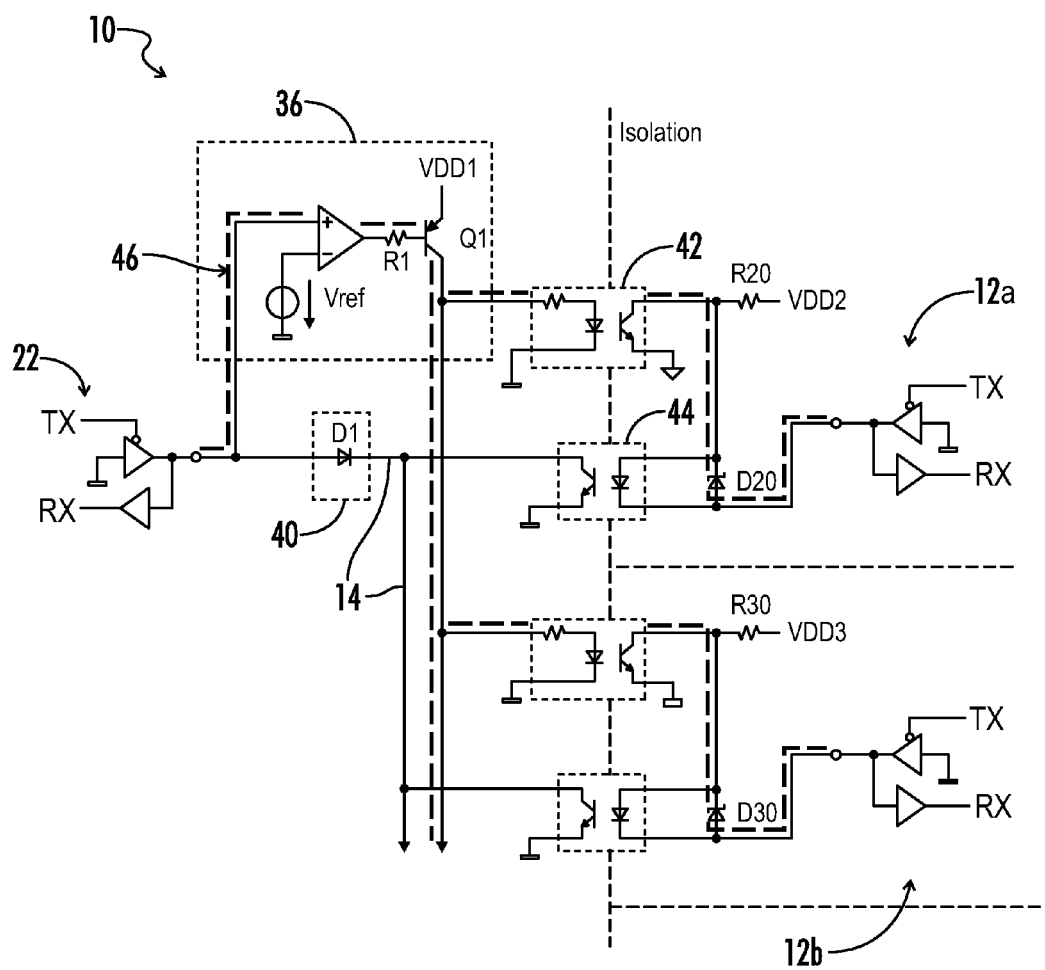
FIGS. 3a-3b are block diagrams showing first and second communications paths, respectively, in the bidirectional communications protocol of FIG. 2.
Figure 3B:
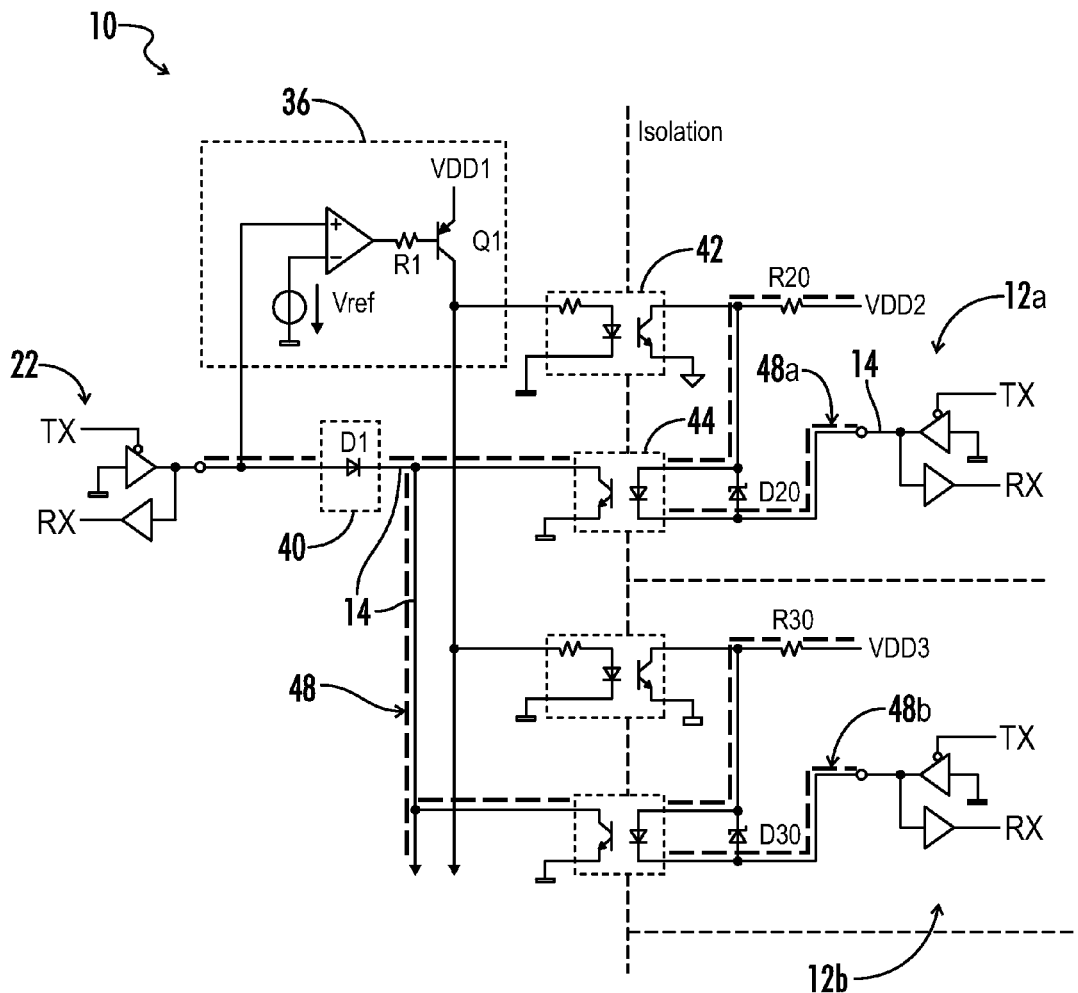

Referring now to FIGS. 2, 3a and 3b, an embodiment of the data communications circuitry 24 and first isolation circuits 26 of the power control system 10 may be described in greater detail, as well as methods of providing bidirectional data communication thereby, but various alternative and equivalent structures may be anticipated within the scope of the present invention.

Referring first to FIG. 2, the digital controller 16 includes transmit and receive (RX/TX) communications circuitry 50 such as is well known in the art. An encoder circuit 36 is coupled on a first end to the RX/TX circuitry 50 along the communications medium 14 and via a first node 52. In an embodiment as shown, the encoder circuit 36 includes a comparator 38 having a first input coupled to the first node 52 and a second input coupled to a reference voltage source providing a reference voltage Vref, and having an output coupled via a resistor R1 to the base of semiconductor switch Q1. The semiconductor switch Q1 in the example shown is a PNP bipolar junction transistor having its emitter coupled to voltage source VDD1, but various alternative switches Q1 may potentially be used within the scope of the present invention.

A decoder circuit 40 may be further coupled on a first end to the first node 52. The decoder circuit 40 in an embodiment as shown in FIG. 4 can be a diode D1 having its anode coupled to the first node 52.

The RX/TX circuitry 50, the encoder circuit 36 and the decoder circuit 40 may collectively be referred to as a first stage 24 or digital control stage 24 of the bi-directional communications bus configuration of the present invention.

In an embodiment as shown, the digital controller 16 is further coupled to each of the one or more output modules 12 via a galvanic isolation circuit 26 which further includes first and second opto-isolator modules 42, 44. Referring specifically to an exemplary first output module 12$a$, a first opto-isolator 42 is coupled on a first end to the encoder circuit 36 and coupled on a second end to RX/TX circuitry 56 in the output module 12$a$ via a second node 54. A second opto-isolator 44 is coupled on a first end to the decoder circuit 40 and coupled on a second end to the second node 54. Both of the opto-isolators 42, 44 are effective to provide galvanic isolation between the digital controller 16 and the output module 12$a$ when deactivated, or otherwise stated when a current path is not present at an input end of the respective opto-isolator 42, 44.

In various embodiments such as shown in FIG. 2, the first opto-isolator module 42 may have, for example, a light-emitting diode (LED) or photodiode on an input end and a photo-detector on an output end. The LED or photodiode has an anode coupled to the switch Q1. The photo-detector in various embodiments may take on various forms as known in the art which are effective to provide opto-isolation with respect to the input LED. However, referring in particular to FIG. 2, the photo-detector in a particular embodiment is an NPN phototransistor having its collector coupled to a node between the output module 12$a$ (via diode D20) and voltage source VDD2 (via resistor R20).

Likewise, the second opto-isolator module 44 may have on an input end an LED or photodiode with its anode coupled to the cathode of the diode D20, and its cathode coupled to the anode of diode D20. A phototransistor on the output end of the second opto-isolator 44 has its collector coupled to the digital controller 16 via the decoder circuit 40.

In various embodiments current-blocking circuitry may be provided with respect to the second opto-isolator 44 which effectively prevents current from entering and activating the opto-isolator 44 when the communications medium 14 is pulled low for communications from the digital controller 16 to the output module 12$a$, but permits the opto-isolator 44 to be activated when the communications medium 14 is pulled low by the output module 12$a$. Referring to the embodiment shown in FIG. 2, a diode D20 is coupled in series between the first opto-isolator 42 and the second node 54, with the anode of diode D20 coupled to the second node 54 and the cathode of diode D20 coupled to the first opto-isolator 42. The diode D20 is further coupled in parallel with the second opto-isolator 44.

The galvanic isolation circuit 26, in the embodiment shown including the diode D20, the first and second opto-isolators 42, 44 and the RX/TX circuitry 56 may collectively be referred to as a second stage of the bi-directional communications bus configuration of the present invention.

Figure 17:
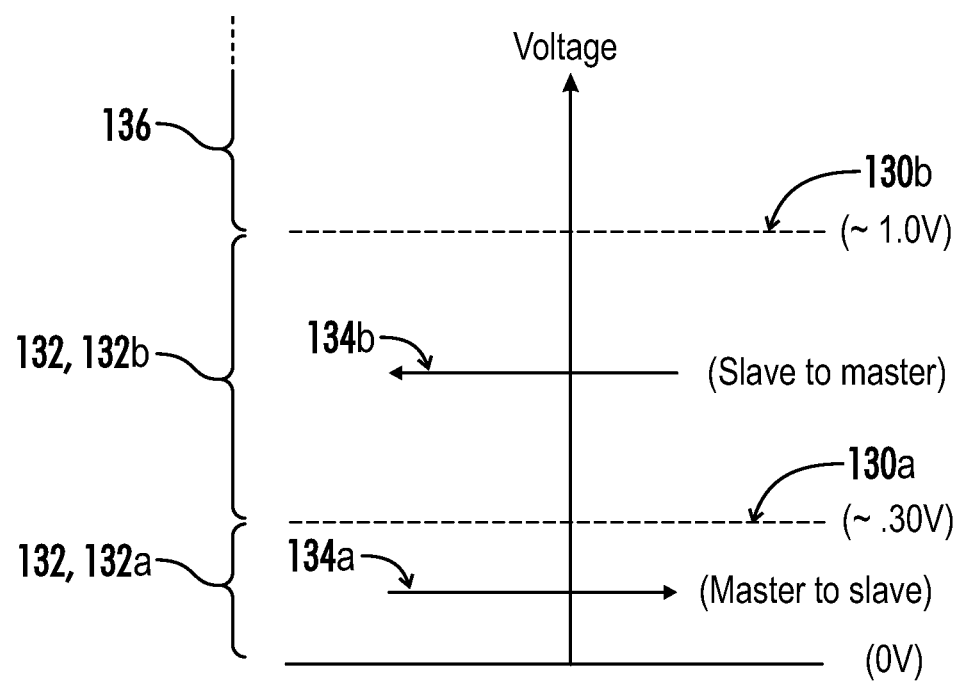
FIG. 17 is a graphical diagram showing logic states, voltage levels and voltage thresholds in accordance with an embodiment of the present disclosure.

When no communications are being transmitted from either of the digital controller 16 or the one or more output modules 12, the communications medium 14 may be described as being in or having a high logic state. In various embodiments, the high logic state may be associated with a particular voltage range greater than first and second voltage thresholds and detectable by the digital controller 16 and in various embodiments also by the one or more output modules 12 as a high logic state, wherein communications may freely be initiated. In an embodiment as shown in FIG. 17 and further described herein, the high logic state 136 may be associated with a bus voltage or a voltage on the communications medium of greater than the second threshold voltage 130$b$, this second threshold voltage being higher than the voltage drop of the decoder 40, or in a particular example about 1.0V, although the amount may vary depending on the circuitry associated with the system and various alternative ranges are well within the scope of the present invention.

The digital controller 16 and the one or more output modules 12 may be configured therefore to detect a low logic state 132 of the communications medium when a bus voltage or voltage on the communications medium is detected by the device receivers (RX) as being less than or equal to the second threshold voltage 130$b$.

Referring to FIGS. 3$a$ and 17, the digital controller 16 may be generally configured to initiate data communications along a first data transmission path 46 by pulling the communications medium 14 to a voltage which is less than or equal to the second threshold voltage 130$b$ such that the communications medium 14 is detectable by the digital controller 16 and the output modules 12 as being in a low logic state 132. The digital controller 16 may more particularly be configured to pull the voltage on the communications medium 14 to a first low voltage 134$a$ which is less than the first threshold voltage 130$a$ such that the communications medium 14 is further detectable by the encoder circuit 36 as being in a low logic state 132$a$. The encoder circuit 36 may be further configured to detect a low logic state 132$a$ only when the communications medium 14 is pulled to a voltage less than the first threshold voltage 130$a$ (which is less than the second threshold 130$b$) and not detect low logic states 132, 132$a$ when the communications medium 14 has a voltage greater than the first threshold voltage 130$a$, whether below the second threshold voltage 130$b$ or otherwise. In other words, the encoder circuit 36 may be configured in various embodiments to substantially equate the second low voltage (logic) state 132$b$ with the high voltage (logic) state 136.

The voltage level to which the digital controller 16 pulls the communications medium, and further defining the first low voltage 134$a$, may in an embodiment as shown in FIGS. 2 and 3$a$ be further determined in accordance with the reference voltage Vref on the second input of the comparator 38 of the encoder circuit 36. The comparator 38 and by extension the encoder circuit 36 generally thereby detects a low logic state 132$a$ for the communications medium 14, or alternatively stated a portion of the communications medium 14 coupled to the first input of the comparator 38, where the first input has been pulled lower than the reference voltage Vref. The reference voltage Vref in this context may further be equal to the first voltage threshold 130$a$, and may in various embodiments be defined as a voltage being lower than the voltage drop of the diode D1 in the decoder circuit 40 (e.g., ~0.6V), but higher than the first voltage level 134$a$, or about 0.3V in the present example.

Still referring to FIG. 3$a$, when the comparator 38 of the encoder circuit 36 detects a low logic state 132$a$ for the communications medium 14, the comparator 38 turns on the switch Q1 (in the example shown a PNP transistor Q1) via resistor R1 coupled to the base of the switch Q1, thereby in turn activating the one or more first opto-couplers 42 which may be coupled to the collector of the switch Q1. The remainder of this description with regards to the first transmission path 46 may refer to a portion of the first transmission path 46 relative to a first output module 12a from among the one or more output modules 12, the operating features being substantially equivalent with respect to each branch or portion of the communications medium 14 relative to each output module 12.

Upon activation of the first opto-isolator 42, the opto-isolator output may pull low the communications medium via the diode D20 to below the first threshold voltage. As the bus receiver RX associated with the output module 12a is configured to detect a low logic state even where the communications medium 14 is pulled low via a diode, the output module 12a may detect the low logic state. The second opto-isolator 44 will remain inactive as the forward biased diode D20 prevents any current flow into the opto-coupler 44.

Referring now to FIG. 3b, the one or more output modules 12 (in the example shown output modules 12a, 12b) may be configured to initiate data communications along alternative data transmission paths 48a, 48b by pulling the communications medium 14 low. For the remainder of this particular description, a second data transmission path 48, 48a will be described with respect to the first output module 12a as described above, with additional data transmission paths 48, 48b . . . 48x being associated respectively with any additional output modules 12b . . . 12x as may be further included in the power controls system 10 of the invention, and with the understanding that the protocol with respect to any one of the one or more output modules 12 may be substantially equivalent and that further description may be omitted as unnecessary.

When the output module 12a pulls the communications medium 14 low, or more particularly pulls the communications medium 14 to below the first threshold voltage, a current path from source VDD2 through resistor R20 and the second opto-isolator 44 opens and activates the second opto-isolator 44. The second opto-coupler 44 output subsequently pulls low the communications medium 14 in the digital controller stage of the system 10 via the decoder circuit 40.

As the digital controller 16 may be configured to detect a low logic state even where the communications medium 14 has been pulled low via the diode D1 in the decoder circuit 40, or in other words the communications medium 14 has been pulled to a voltage level less than the second threshold voltage 130b, the digital controller 16 detects the logic low state 132b where the second opto-isolator 44 has been activated.

Because the communications medium 14 is pulled low in this case via the diode D1 in the decoder circuit 40 and not by the digital controller 16 itself, the voltage on the communications medium 14 does not drop below the first threshold voltage 130a and therefore the encoder circuit 36 does not detect a low logic state 132a. In other words, the voltage on the communications medium 14 and at the first input of the comparator 38 of the encoder circuit 36 does not drop below the reference voltage Vref at the second input of the comparator 38 of the encoder circuit 36 and the encoder output remains unchanged. Therefore, the first opto-isolator 42 remains inactive during data transmissions initiated from the output module 12a.

Figure 4:
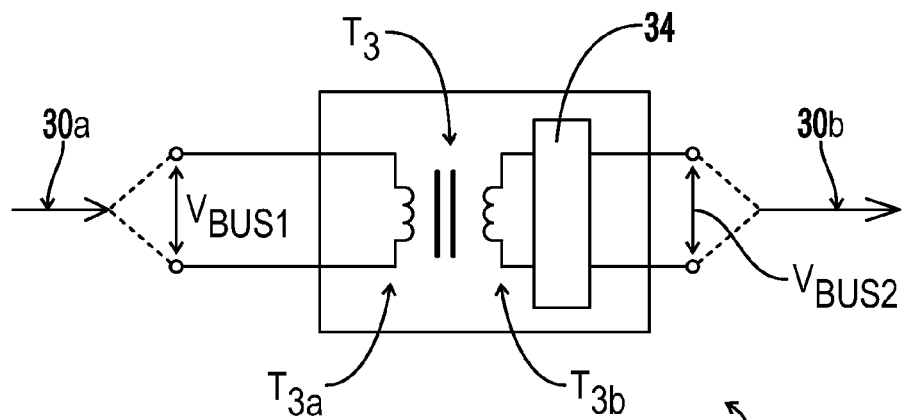
FIG. 4 is a circuit schematic showing a second isolation circuit in accordance with an embodiment of a system of the present invention.

Referring now to FIG. 4, in an embodiment a second isolation circuit 28 is coupled on one end to a first portion of the intermediate power bus 30a wherein a first voltage $V_{BUS1}$ is received, and coupled on the other end to a second portion of the intermediate power bus 30b wherein a second voltage $V_{BUS2}$ is provided. In various embodiments, a plurality of second isolation circuits 28 are provided, with a second isolation circuit 28 being associated with each of the plurality of output modules 12. The second isolation circuits 28 may be identical or may vary in configuration so as to produce varying second voltages $V_{BUS2}$ within the scope of the present invention. As shown in FIG. 4, the second isolation circuit 28 may include an isolation transformer T3 having a primary winding T3a coupled to the first portion of the intermediate power bus 30a and a secondary winding T3b magnetically coupled to the primary winding T3a but effective to provide galvanic isolation across the transformer T3. A synchronous rectification circuit 34 may be coupled between the secondary winding T3b of the isolation transformer T3 and the second portion of the intermediate power bus 30b. In various embodiments the synchronous rectification circuit 34 may include one or more synchronous rectifiers for providing independent synchronous rectification of the voltage provided to the associated output module 12. Various configurations of circuitry for performing synchronous rectification on the intermediate bus voltage are anticipated as being applicable within the scope of the present invention, as they are well known in the art and further description may herein be omitted.

Figure 5:
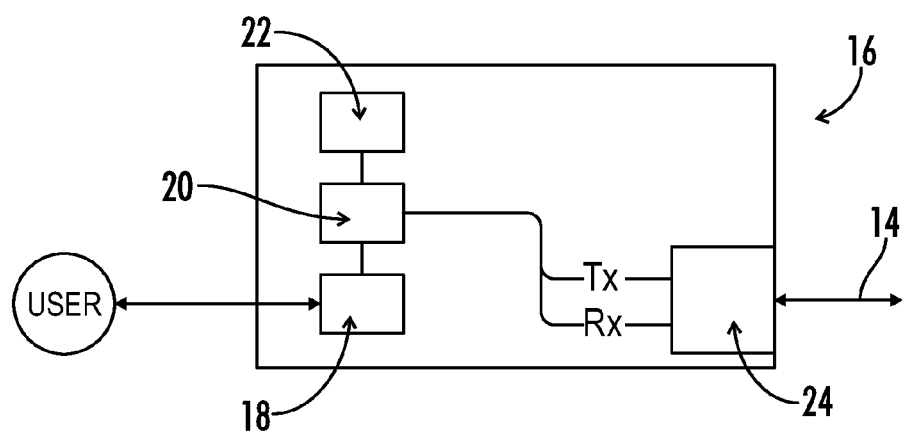
FIG. 5 is a circuit schematic showing a digital power manager in accordance with an embodiment of a system of the present invention.

Referring now to FIG. 5, an embodiment of a digital power manager 16 of the present invention may include a user interface 18, a controller 20, a memory circuit 22 and data communications circuitry 24 (as described above for example). The particular configuration of the digital power manager 16 is not critical to the scope of the present invention, and various alternatives as previously known to those of skill in the art may be used to perform digital power management functions as stated herein herein. It may be further anticipated that the digital power manager 16 be arranged in a single integrated circuit.

In the embodiment shown, the digital power manager 16 may execute stored instructions to cause the controller 20 to control and monitor operations of the digital power manager 16 responsive to commands from a host user, interrupts, and status data received from the output modules 12. The controller 20 may selectably program operational parameters or otherwise provide programming data for the plurality of output modules 12 via the bidirectional communications medium 14 and the data communications circuitry 24. Such operational parameters may include one or more of an output voltage Vout, over-voltage and over-current limits, transient response adjustment, and output sequencing, etc. The controller 20 may further selectably receive monitoring data from the plurality of output modules 12 via the bidirectional communications medium 14 and the data communications circuitry 24. The monitoring data may in various embodiments be selected individually for monitoring by a user or automatically provided at a predetermined frequency.

The controller 20 is coupled to the memory circuit 22, which may include two memory blocks such as a non-volatile memory and a random access memory RAM), wherein upon startup data is written from the non-volatile memory to the RAM and the controller 20 can access the RAM to make use of the written data during operation.

The controller 20 is further coupled to the user interface 18, which may in various embodiments be an I²C graphical user interface which is coupled to a host system equipped with a graphical user interface. The digital power manager 16 may generally therefore provide translation between the I²C interface coupled to the host system and the bidirectional communications medium 14 which is further coupled to the plurality of output modules 12.

Figure 6:
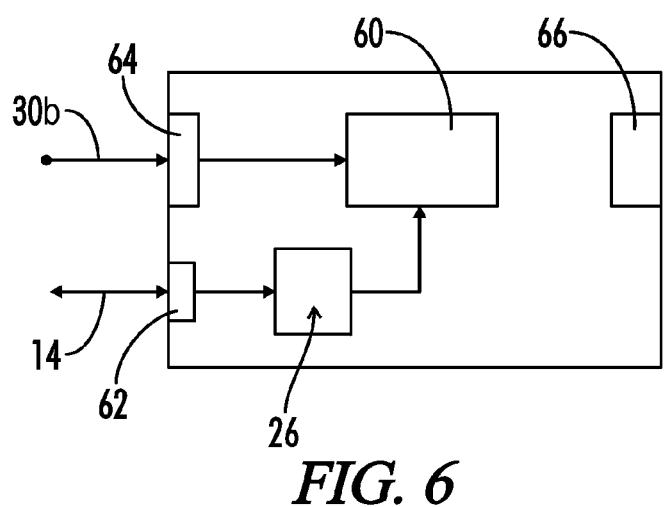
FIG. 6 is a circuit schematic showing an output module in accordance with an embodiment of a system of the present invention.

Referring now to FIG. 6, an embodiment of an output module 12 of the present invention may include a first connector 66 or output connector, a second connector 64 coupled to the intermediate power bus 30b and a third connector 62 coupled to the bidirectional communications bus 14. An output module power circuit 60 may be coupled between the second connector 64 and the first connector 66, and may in various embodiments be embodied in an output module power board including, for example, a power transformer which provides galvanic isolation between the second connector 64 and the first connector 66, and power conversion circuitry as known in the art for converting the intermediate bus power $V_{BUS2}$ into a desired output power Vout.

The first isolation circuit 26 as described above may be coupled between the third connector 62 and the output module power circuit 60, and may further define a serial communications bus interface. In various embodiments, the first isolation circuit 26 may be embodied in an output module digital control board. Alternatively, the first isolation circuit 26 and the output module power circuit 60 may in other embodiments further be collectively embodied in a single output module circuit board 98 (see for example FIG. 11).

Digital control circuitry may be included on either of the output module power board or the output module digital control board, or alternatively the collectively embodied output module circuit board 98, which is effective to regulate the power conversion of the output module 12 in accordance with control signals received from the digital power manager 16 via the serial communications bus 14. In various embodiments, the digital control circuitry may be embodied in a microcontroller or other integrated circuit, but various alternatives may be used as are known to those of skill in the art and within the scope of the present invention.

Figure 7:
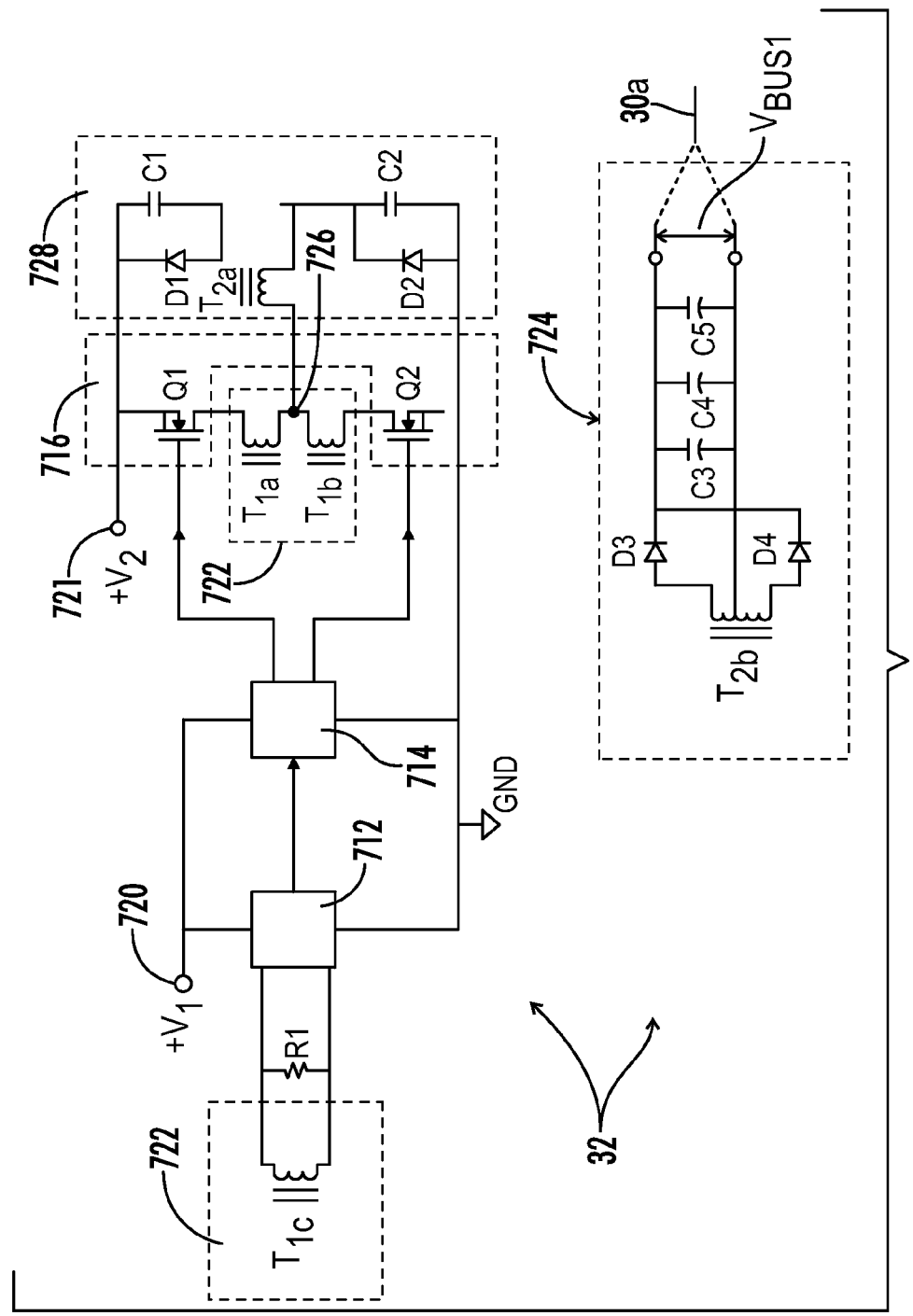
FIG. 7 is a circuit schematic showing an open loop half-bridge power converter in accordance with an embodiment of a system of the present invention.

Referring now to FIG. 7, an embodiment of an open-loop half-bridge converter 32 of the present invention may be described in detail. The power converter 32 as shown includes a controller 712, an inverter driver 714, an oscillating inverter 716, a resonant signal detection circuit 722, and output terminals for providing output power Vbus1 to the intermediate power bus 30a. The controller 712 is coupled to a first positive input terminal 720 wherein a first input voltage V1 is provided with respect to a negative input terminal GND to power the controller 712 specifically. This input voltage V1 is typically about 12 volts, but may vary depending on the specifications of the controller 712.

The controller 712 in various embodiments as shown may be a high performance resonant mode microprocessor 712 capable of providing pulse output signals to the inverter driver 714. The inverter driver 714 in an embodiment as shown is a half-bridge driver integrated circuit capable of providing gate drive signals to the oscillating inverter 716 in response to pulse signals received from the controller 712. The controller 712 and the inverter driver 714 may alternatively be embodied within the scope of the present invention in discrete analog circuitry rather than microprocessors or integrated circuits. Further, it is anticipated within the scope of the present invention that the controller 712 and the inverter driver 714 may be collectively embodied in a single microprocessor or IC.

The oscillating inverter 716 includes two switching elements Q1, Q2 in a half-bridge configuration as well known in the art. The inverter 716 is coupled between a second positive input terminal 721 and the negative input terminal GND, whereby a higher voltage V2 (e.g., 360V) may be provided. The switching elements Q1, Q2 turn on and off in an alternating fashion in accordance with a switching frequency determined by the gate drive signals being delivered from the inverter driver 14. The switching elements Q1, Q2 operate at full duty cycle.

In an embodiment as shown in FIG. 7 one or more load circuits 724 may be provided each of which includes a secondary winding T2b of a load transformer T2 having a primary winding T2a further coupled to the inverter 16. The load transformer T2 provides galvanic isolation between the intermediate power bus 30a, and therefore output power Vbus1 provided to the one or more output modules 12, and the inverter 16. A magnetizing inductance of the primary winding T2a in conjunction with capacitors C1, C2 further defines a resonant circuit 28.

The load circuit 724 may further in various embodiments be defined to include an output stage 724 of the converter 32 having a capacitor-loaded center tapped half-bridge rectifier (T2b, D3, D4, C3, C4, C5).

The converter 32 may be configured and programmed to operate in a manner which ensures zero volt switching (ZVS) of the switching elements Q1, Q2 during all operating conditions. Zero volt switching as used herein may generally refer to an operation of turning on each switch Q1, Q2 in turn with substantially zero voltage present across the switch Q1, Q2, as is generally known in the art.

Figure 8:
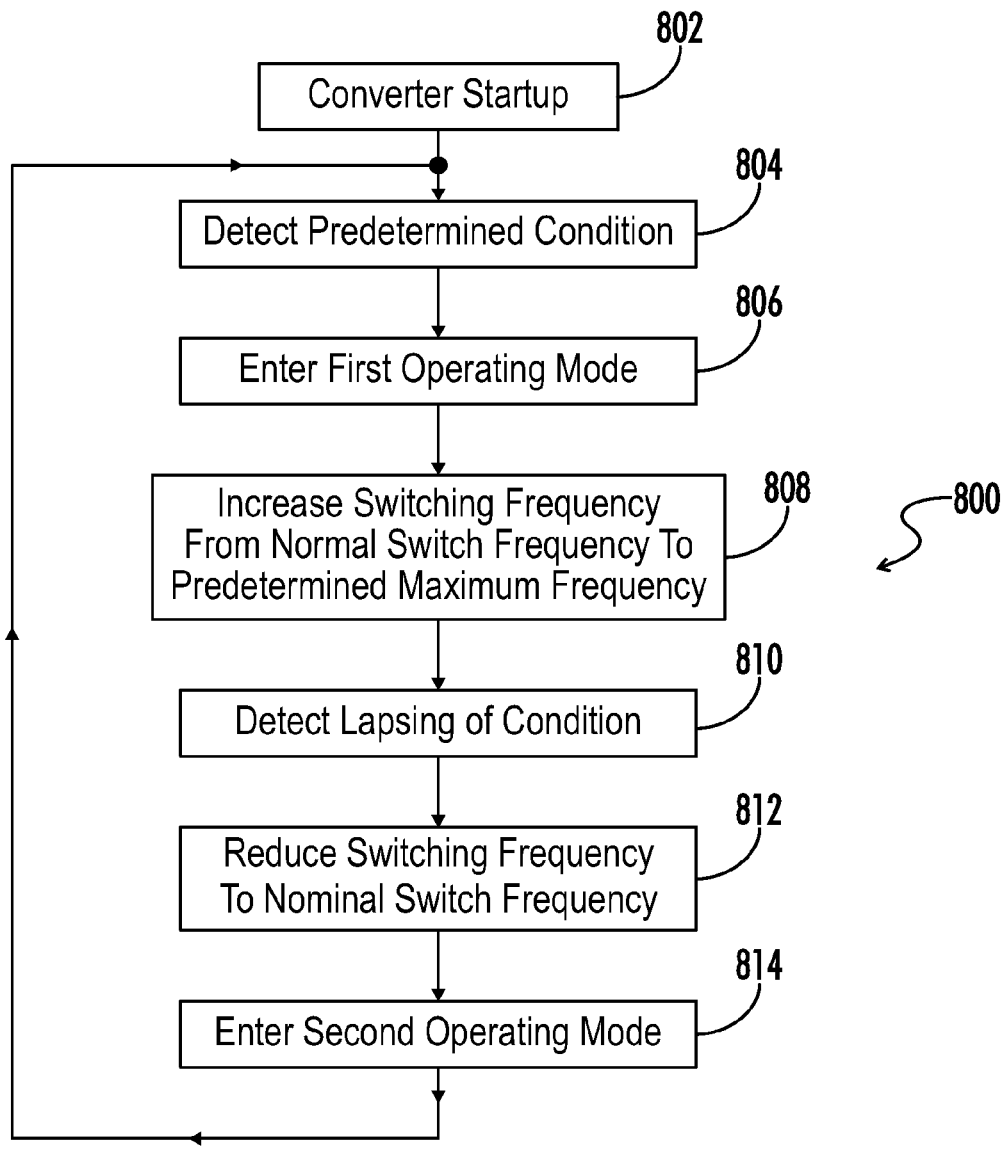
FIG. 8 is a flowchart showing an embodiment of a method of operation of the open loop half-bridge power converter of FIG. 7.
Figure 9:
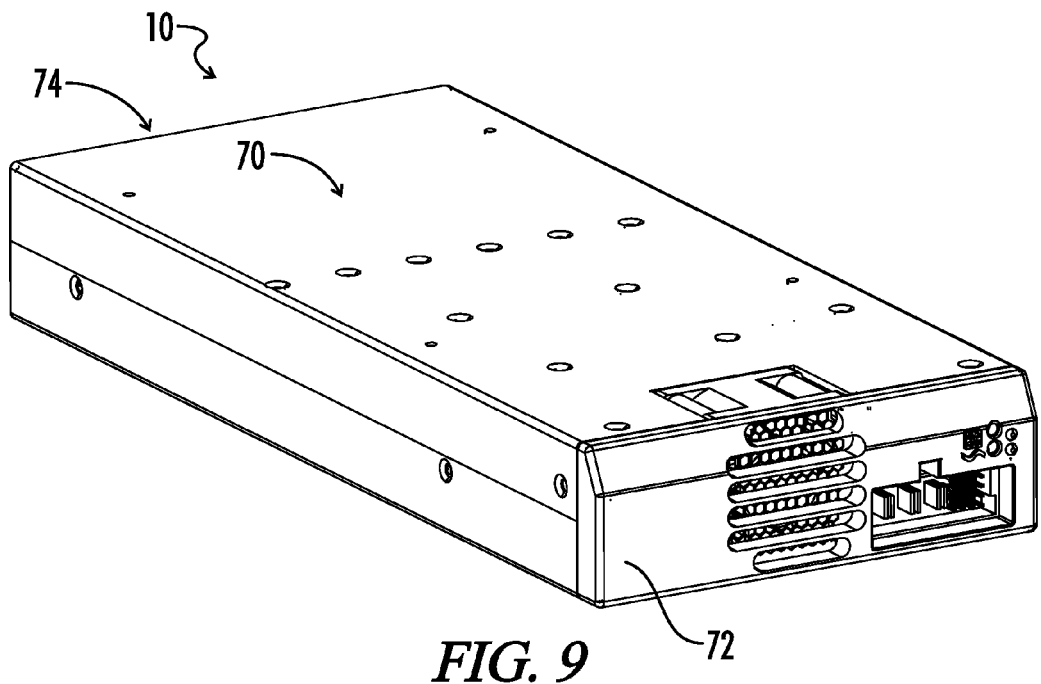
FIG. 9 is an isometric exterior view of a modular power supply and control system in an embodiment of the present invention.
Figure 10:
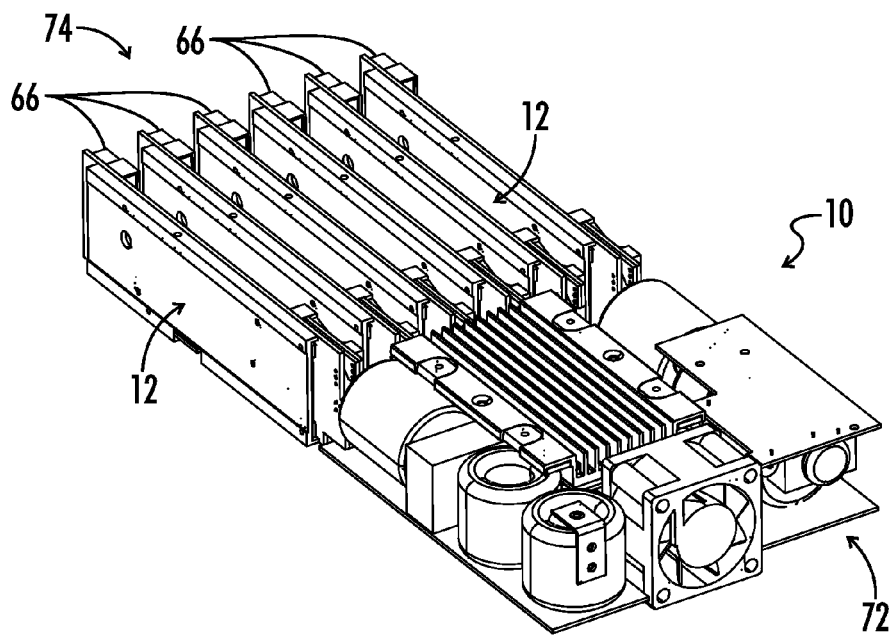
FIG. 10 is an isometric interior view of the modular power supply and control system of FIG. 9.

Referring to FIG. 8, an embodiment of a method of operation 100 for the open loop half bridge resonant converter 10 may herein be described.

After converter startup or otherwise initiation of an input voltage V1 to the converter 32 (step 802), the controller 712 may be programmed to detect the presence of a predetermined condition such as for example a soft start condition (step 804). In various embodiments, the converter 32 may determine the presence of the predetermined condition by receiving an input signal from the detection circuit 722 and comparing the result with a predetermined threshold or an internal reference signal which may for example be provided from an external source within the scope of the present invention. Where the predetermined condition includes short circuit conditions, a sudden drop in output voltage from the converter 32 may therefore be detected by the detection circuit 722. Where the predetermined condition further or alternatively includes soft start conditions, the lack of an output voltage from the converter 32 upon initial startup of the converter 32 may further be detected by the detection circuit 722. In various embodiments the converter 32 may alternatively or additionally determine the presence of the predetermined condition in response to a failure or adjustment in the input voltage V1 received from the first input terminal 720.

The detection circuit 722 in an embodiment as shown in FIG. 7 includes a transformer T1 having a first winding T1a coupled to the emitter of switching element Q1, and a second winding T1b coupled to the collector of switching element Q2, with the windings T1a, T1b both coupled to a node which may further be defined as an output terminal for the inverter circuit 716, and to which the load circuit 724 may for example be coupled via the isolation transformer T2. The detection circuit 722 further includes a third winding T1c which is coupled to the controller 712 to provide a detection signal indicative of for example a current through the resonant inductor L2a and/or an output from the switching elements Q1, Q2 of the inverter circuit 716, whereby for example zero volt switching operations for the inverter circuit 716 may be provided and maintained.

Upon detecting a predetermined condition, the controller 712 then enters a first operating mode (step 806) associated with the predetermined condition. Rather than maintaining a fixed frequency and modulating the pulse width of the pulse output signals to the driver 714, the controller modulates the switching frequency and maintains the pulse width of the signals throughout the duration of the predetermined condition (step 808). The switching frequency in the first operating mode may in various embodiments be increased gradually to a predetermined maximum frequency such as for example 500 kHz, or other frequency as may be defined by component values in the converter 32. While in this example the frequency is adjusted in response to a soft start condition, the same operation by the controller 712 may further be carried out for other user-defined predetermined conditions representing a non-steady state condition where the pulse width would otherwise be reduced by various controllers as previously known in the art.

The controller 712 may be programmed to maintain the predetermined maximum switching frequency until having determined that the predetermined condition has lapsed (step 810). This may be determined for example by internally clocking the condition for a predetermined time associated with the condition. Where the predetermined condition which triggered the first operating mode was a short circuit condition however, in various embodiments the controller 712 may be programmed to maintain the first operating mode until for example a detection signal from the detection circuit 722 indicates the short circuit condition is no longer present.

After lapsing of the predetermined condition, the controller 72 responds (step 812) by gradually reducing the switching frequency of the switching elements Q1, Q2 to a nominal frequency, such as for example 130 kHz. The controller 72 then enters a second operating mode (step 814) associated with steady state operation of the converter 32. During the second operating mode the switching frequency is maintained at the fixed nominal frequency. The method 800 then returns to step 804 and monitors operation of the converter 32 for another predetermined condition.

During both of the first and second operating modes, the duty cycle of the switching elements Q1, Q2 remains at full duty cycle to better ensure zero volt switching operations.

In various embodiments it may be desirable to further reduce energy losses in certain components in response to, for example, a short circuit condition. The first operating mode for the converter 32 in these embodiments may further include a pulse skipping mode. In a pulse skipping mode as known in the art, the controller 712 may skip pulses and thereby prevent the switching devices Q1, Q2 from turning on during the duration of the pulse skipping mode, which may be for example a predetermined time period or as determined by an external trigger, or for one or more predetermined time periods as determined by the continued existence of the short circuit condition.

However, even in the various embodiments utilizing pulse skipping it may be understood that zero volt switching is maintained for the switching elements Q1, Q2.

Referring generally now to FIGS. 9-16, various embodiments of a modular power supply 10 and control system of the present invention may include a pluggable interconnection system for simple and secure installation of the power supply 10 and connection to external loads.

Referring more particularly to FIGS. 9-12, an embodiment of the modular power supply 10 includes a box-shaped housing 70 with four sides, a first end 72 and an opposing second end 74 to define an interior of the power supply 10. A plurality of output modules 12 are positioned in parallel with each other proximate the second end 74 of the power supply 10, whereby one or more first pluggable connectors 66 associated with each output module 12 are further arranged in parallel and may be accessible from outside of the power supply 10.

In various embodiments, the second end 74 of the power supply 10 may be substantially enclosed to define a face of the power supply 10 having a plurality of apertures through which the plurality of first pluggable connectors 66 may be accessed. In various alternative embodiments, the second end 74 of the power supply 10 may be fully or partially open to permit additional access to components within the interior of the power supply 10 and further to permit increased air flow through the interior of the power supply 10.

Figure 11:
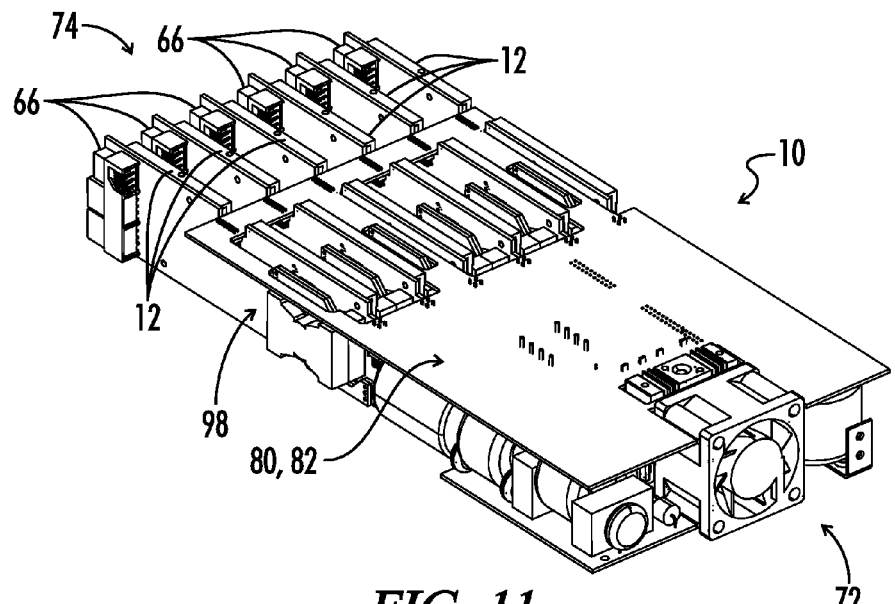
FIG. 11 is an inverted isometric interior view of the modular power supply and control system of FIG. 9.
Figure 12:
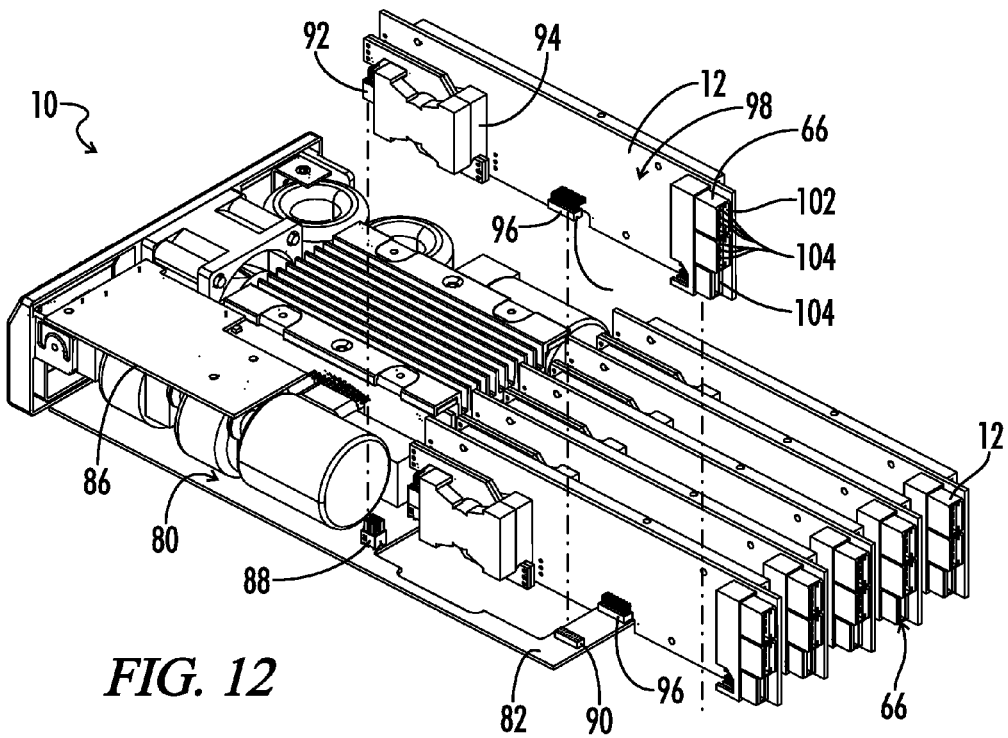
FIG. 12 is a reversed and exploded isometric interior view of the modular power supply and control system of FIG. 9.

In an embodiment as shown generally in FIGS. 11-12, a modular power supply 10 in accordance with the present invention may have a mother board 80 upon which resides circuitry described in greater detail above such as for example a power factor correction (PFC) controller, an intermediate power converter 32 and intermediate power bus 30, and a system controller 16 such as for example a digital power manager 16. A plurality of internal power connectors 88 may be provided on the mother board 80 for coupling each of the output modules 12 to the mother board 80. The connectors 88 may be surface mounted by, for example, soldering or any other equivalent method, or may be integrally formed with respect to the substrate of the mother board 80, without otherwise affecting the scope of the present invention. In various embodiments the connectors 88 may be pluggable connectors 88 such that any output module 12 may be detachably coupled to the mother board 80 as desired.

A serial communications board (not shown) may be provided which physically interconnects, for example, the system controller 16 to the plurality of output modules 12 via a communications medium 14 such as, for example, a serial data bus 14. The serial communications interface may alternatively be made up of a first portion 82 or serial communications portion 82 of the mother board 80 (as shown in FIGS. 11-12). A plurality of internal control connectors 90 may be provided on the serial communications portion 82 for coupling each of the output modules 12 to the serial communications portion 82. The connectors 90 may be surface mounted by for example soldering or any other equivalent method, or may be integrally formed with respect to the substrate of the serial communications portion 82, without otherwise affecting the scope of the present invention. In various embodiments the connectors 90 may be pluggable connectors 90 such that any output module 12 may be detachably coupled to the serial communications portion 82 of the mother board 80 as desired.

An EMI filter board 86 may optionally be provided as well, and in various embodiments two or more of the mother board 80, serial communications portion 82, and EMI filter board 86 as described herein may be combined into a single board having equivalent functionality, or may further be divided into additional boards rather than for example having a single mother board 80 with each of the above-recited circuitry.

The output modules 12 may include a second connector 92 which is configured to mate with (e.g., plug in to) the internal power connector 88 previously defined with respect to the mother board 80. In various embodiments (not shown), the second connector 92 may be positioned on a first portion of the output module 12, or alternatively an output module power circuit board, which further may include a modular power transformer coupled between the second connector 92 and the first connector 66. An output power from the output module 12 may therefore be galvanically isolated from the intermediate bus power $V_{BUS2}$ provided from the intermediate power bus 30b to each of the individual output modules 12, and each output power provided to one of various external loads may be galvanically isolated with respect to each other output power.

The output modules 12 may further, consistent with embodiments as described above, include a third connector 96 which is configured to mate with (e.g., plug into) the control connector 90 previously defined with respect to the serial communications portion 82. In various embodiments (not shown), the third connector 96 may be positioned on a second portion of the output module 12, or alternatively an output module digital control circuit board, which may further include the first isolation circuit 26 as described above for providing galvanic isolation between the third connector 96 and the first connector 66. Each output module 12 may therefore generally be galvanically isolated from the controller 16 in the power supply 10 and from each other output module 12 with respect to the serial communications bus 14.

In an embodiment (not shown), the first portion of the output module 12 may be oriented in parallel with respect to first portions of each other output module 12 across the length of the second end 74 of the power supply 10, or for example longitudinally with respect to the motherboard 80 of the power supply 10. The second portion in such an embodiment may be coupled parallel to the first portion of the output module 12, or for example laterally with respect to the motherboard 80, and further laterally with respect to the serial communications board 82.

In various embodiments however such as shown in FIG. 12, the first and second portions and associated circuitry as described above may instead be included on a single output module circuit board 98 having a given orientation either lateral or longitudinal with respect to the mother board 80 of the modular power supply 10 and within the scope of the present invention.

In such embodiments where the output modules 12 include one or both of the second and third connectors 92, 96, each output module 12 may thereby be configured for detachable coupling with the power supply 10 in any of a plurality of positions arranged in parallel with respect to the second end 74.

Figure 13A:
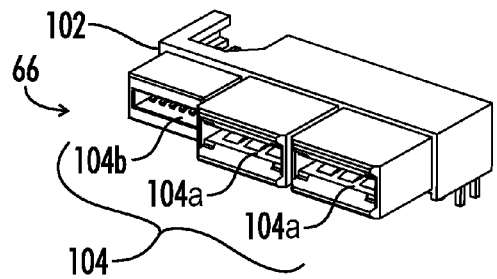
FIG. 13a is an isometric view of an embodiment of an output module connector housing for an output module in the modular power supply of FIG. 9.

Referring now to FIGS. 13*a*, *b*, and *c*, the first connector 66 for a particular output module 12 may further include a housing 102 and a plurality of contact terminals 104 by which power and/or communications signals may be transmitted to or received from an external device (e.g., a load) coupled to the output module 12. In various embodiments where both power and communications signals are provided with respect to a common connector 66, it may be understood that the plurality of contact terminals 104 may further include a first set of contact terminals 104*a* suitable for power signals and a second set of contact terminals 104*b* suitable for communications signals. The distinction may be appropriate or required where, for example, a substantially lower tolerance for noise is associated with the communications signals and/or where a greater component rating is desired or necessary with respect to the contact terminals 104*a* for conducting power signals.

Figure 13B:
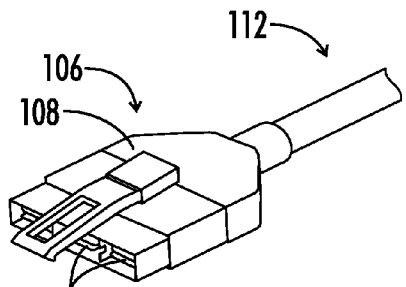
Figure 13C:
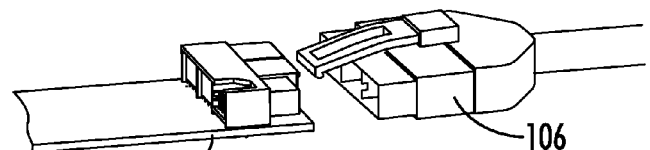
FIG. 13c is a combined view of the connector and cable of FIGS. 13a and 13b in a coupling arrangement.
Figure 14A:
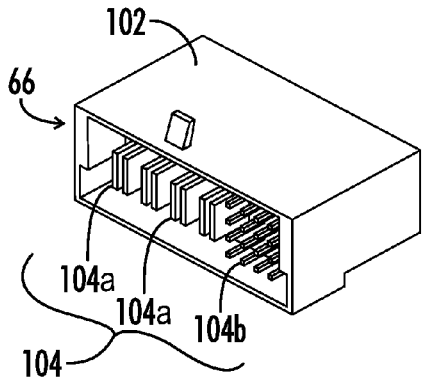
FIG. 14a is an isometric view of another embodiment of an output module connector housing for an output module in a modular power supply of FIG. 9.
Figure 14D:
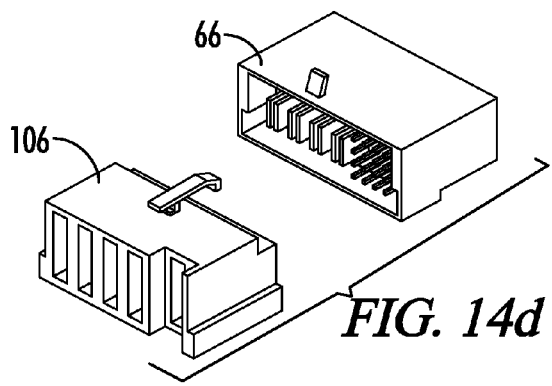
FIG. 14d is a combined view of the connector and cable housing of FIGS. 14a and 14b in a coupling arrangement.
Figure 14B:
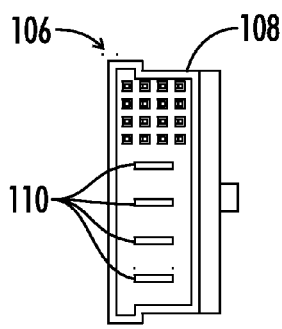
Figure 14C:
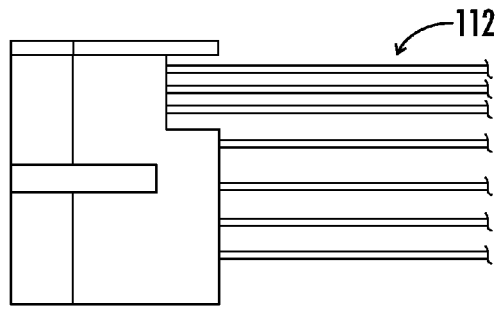
FIG. 14c is a side view of the cable of FIG. 14b.

The load may be electrically coupled to the output module 12 via an external cable 112 and cable connector 106 also having a housing 108 and a plurality of contact terminals 110, with the housing 108 and contact terminals 110 of the external cable connector 106 being configured to mate with the housing 102 and contact terminals 104 of the first connector 66 of the output module 12. In various embodiments, the contact terminals 104 of the first connector 66 may be male (e.g., plugs) which are configured to mate with female contact terminals 110 (e.g., sockets) of the external cable connector 106, as shown in FIGS. 13*a*, 13*b*, and 13*c*, but the opposite configuration may be used as well within the scope of the present invention.

The connectors 66, 106 as shown in FIGS. 13*a*, *b*, and *c* generally are MOLEX-type connectors as known in the art. In various embodiments alternative types and configurations of pluggable connectors may be used within the scope of the present invention. For example, with reference to FIGS. 14*a*, *b*, and *c*, an embodiment of the output connector 66 and of the external cable connector 106 is shown using FCI-type connectors, also previously known in the art. The housings 102, 108 for the various connectors may generally be formed of molded plastic, with the contact terminals 104, 110 being formed of electrically conductive material such as copper or equivalent metallic composite or combination thereof, but various alternative materials and composites are well known for such uses in the art as well and may be understood as being anticipated within the scope of the invention.

Figure 15A:
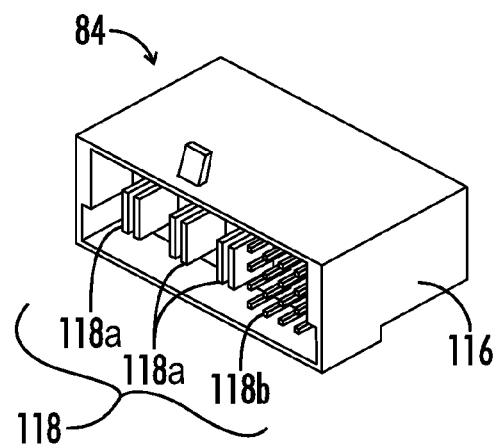
FIG. 15a is an isometric view of an embodiment of an input connector housing for the modular power supply of FIG. 9.
Figure 15B:
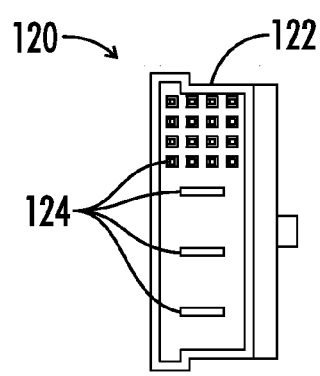
Figure 15C:
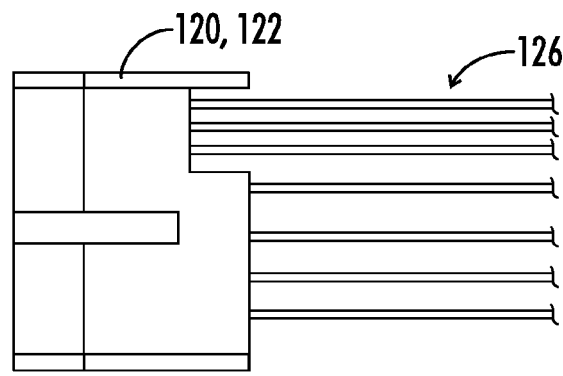
FIG. 15c is a side view of the cable of FIG. 15b.

Referring now to FIGS. 11 and 15*a*, *b*, and *c*, the power supply 10 may further include a pluggable input connector 84 which is substantially similar in configuration to the output connectors 66 of the output modules 12, having a housing 116 and a plurality of contact terminals 118. In various embodiments where both power and communications signals are provided with respect to a common input connector 84, it may be understood that the plurality of contact terminals 118 may further include a first set of contact terminals 118*a* suitable for power signals and a second set of contact terminals 118*b* suitable for data communications signals. Input signals may be provided to the power supply 10 via for example an input power cable 126 having a connector 120 at a first end and with a housing 122 and a plurality of contact terminals 124 configured to mate with the contact terminals 118 of the input connector 84. In various embodiments the contact terminals 118 of the input connector 84 may be male (e.g., plugs) which are configured to mate with female contact terminals 124 (e.g., sockets) of the input power cable connector 120, as shown in FIGS. 15*a*, 15*b*, and 15*c*, but the opposite configuration may be used as well within the scope of the present invention.

Figure 16:
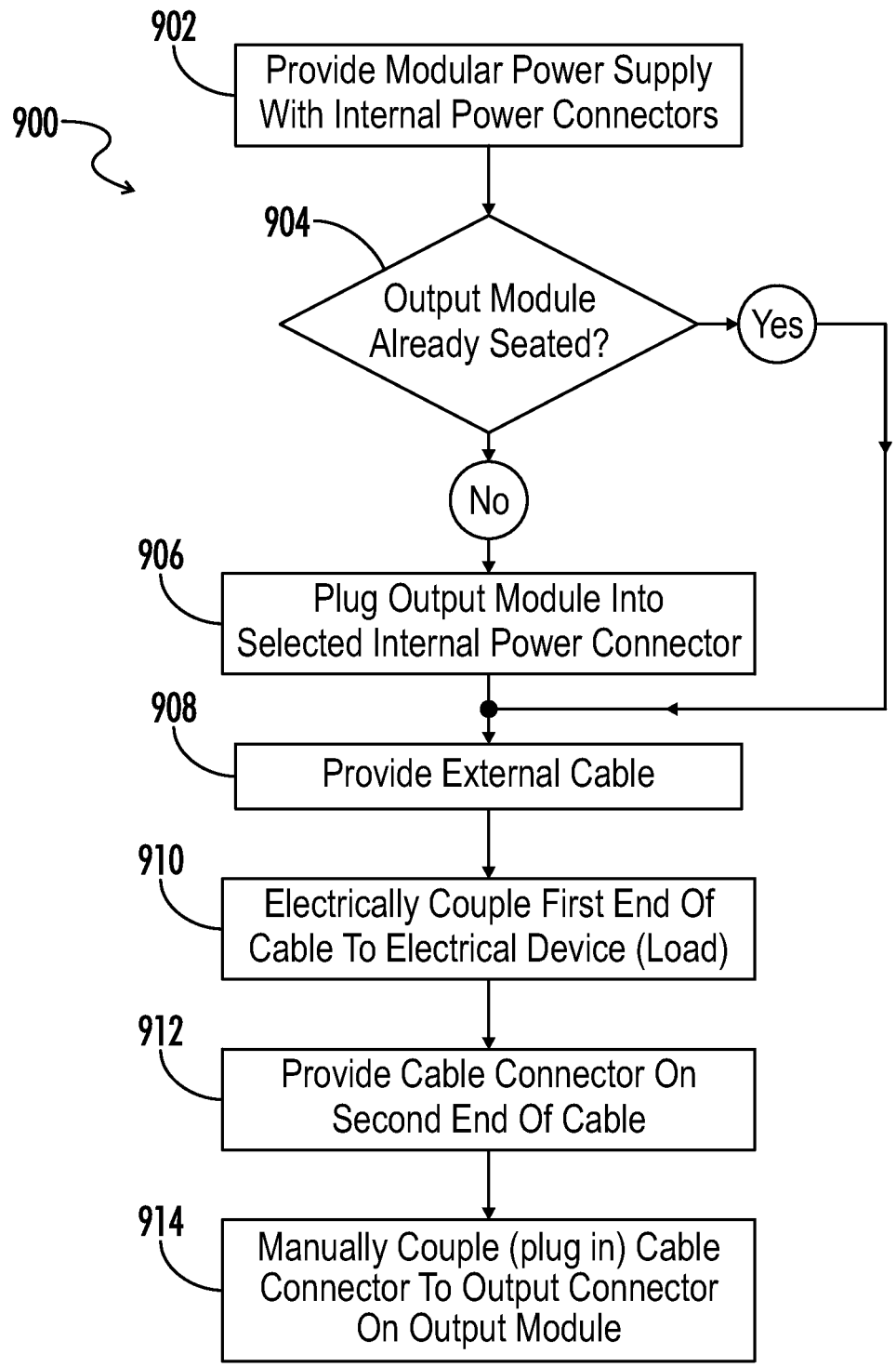
FIG. 16 is a flowchart showing a method of connecting a modular power supply and control system of the present invention to an external load.

Referring now to FIG. 16, an embodiment of a method 900 of connecting a modular power supply 10 of the present invention to an external load may now be described.

In a first step 902, a modular power supply is provided having a plurality of internal power connectors arranged within the power supply, and which may be collectively coupled to a common power bus configured to provide an intermediate bus power to each of the internal power connectors. In various embodiments, each internal power connector may be associated with a communications connector further arranged within the power supply in parallel with the given power connector. The communications connectors in various embodiments may further be collectively coupled to a serial data bus arranged to provide data signals from a common controller such as for example a digital power manager.

One or more output modules may or may not (step 904) be provided as being detachably coupled to internal power connectors and any associated communications connectors within the power supply. In various embodiments each of the one or more output modules includes circuitry configured to convert power provided to the output module into a desired output power based on programmable control signals provided to the output module from the digital power manager via the serial data bus.

If an output module is not previously coupled to an internal power connector and (if available) an associated communications connector programmed for the desired power output to a given external device (e.g., load), in step 906 an output module which has been separately provided is detachably coupled to the appropriate internal connectors. The output module in various embodiments includes integral connectors having contact terminals which are configured to mate with contact terminals of the internal power connector and the communications connector. The appropriate internal connectors for a particular output module may be determined based on preexisting ratings for a particular power connector and control signals for the associated communications connector, or alternatively in various embodiments the output module may be seated in any available slot or equivalent parallel position relative to the end of the power supply, and the digital power manager may be subsequently programmable to control the power output of the output module for whichever internal connectors are associated with the selected position.

If an output module has been provided already coupled with the internal connector(s) of the power supply, the method may skip step 906 and continue with step 908, by providing an external cable. The external cable may be pre-fabricated and provided along with the power supply or fabricated at the location of the actual end electrical device or load.

The cable may in step 910 be electrically coupled at a first end to the load in accordance with the particular requirements of the load input, which may generally be outside of the scope of the present invention. For example, the load input may be a pluggable connector, a BUS BAR interconnection, a terminal strip, or the like, and the first end of the cable may therefore be provided or adjusted to suit the particular case.

In step 912, the cable may on a second end be provided with a cable connector having a housing and a plurality of contact terminals configured to mate with an output connector for any of the one or more output modules, the output connector also having a housing and a plurality of contact terminals. Consistent with the above description in step 908, the cable may be previously provided with a pre-fabricated connector compatible with the output connector on the output module, or may be fabricated proximate the end load.

In step 914, the external cable may be manually coupled to the output module, thereby coupling the external load to receive a desired power output from the modular power supply. The manual coupling is performed by simply plugging in the cable connector on the first end of the cable to the output connector on the selected output module, and requires no additional tools or other equipment from the end user performing the installation.

The previous detailed description has been provided for the purposes of illustration and description. Thus, although there have been described particular embodiments of the present invention of a new and useful "Power Supply Architecture for Controlling and Monitoring Isolated Point-of-Load Regulators," it is not intended that such references be construed as limitations upon the scope of this invention except as set forth in the following claims.

What is claimed is:

1. A power control system comprising:
    a plurality of output modules each independently configured to provide regulated power to an associated load;
    a bidirectional communication medium coupled to each of the plurality of output modules via one of a plurality of galvanic isolation circuits; and
    a digital power manager coupled to the communication medium, the digital power manager further comprising a controller and stored instructions executable by the digital power manager to cause the controller to
        program operational parameters of the plurality of output modules via the communication medium and
        receive monitoring data from the plurality of output modules via the communication medium,
    wherein each output module is isolated from each of the other output modules with regards to data transmission along the communication medium.

2. The system of claim 1, the digital power manager further comprising an I²C graphical user interface.

3. The system of claim 2, the user interface effective to selectably program operational parameters of the plurality of output modules, the operational parameters comprising one or more of an output voltage, over-voltage and over-current limits, transient response adjustment, and output sequencing.

4. The system of claim 3, wherein the user interface is further effective to selectably receive monitoring data from the output modules.

5. The system of claim 1, the communication medium having a default high logic state associated with no communications between the digital power manager and the plurality of output modules,
    wherein the digital power manager comprises circuitry effective to detect the high logic state and to generate a low logic state on the communication medium for transmitting data to the plurality of output modules, and
    wherein each output module comprises circuitry effective to detect the high logic state and to generate a low logic state on the communication medium for transmitting data to the digital power manager.

6. The system of claim 5, wherein the digital power manager further comprises circuitry effective to detect a low logic state generated by an output module and to prevent data transmission from the digital power manager during said detected low logic state.

7. The system of claim 6, wherein each output module further comprises circuitry effective to detect a low logic state generated by the digital power manager and to prevent data transmission from said output module during said detected low logic state.

8. The system of claim 7, each of the plurality of isolation circuits further comprising first and second opto-isolators, the first opto-isolator associated with a first data transmission path from the digital power manager to the associated output module, the second opto-isolator associated with a second data transmission path from the associated output module to the digital power manager.

9. A power control system comprising:
    a plurality of isolation transformers coupled on a primary side to receive an intermediate bus voltage, and further coupled on a secondary side to an associated output module from of a plurality of power supply output modules;
    a digital controller coupled to each of the plurality of output modules via a serial data bus having a default high logic state; and
    a plurality of galvanic isolation circuits providing galvanic isolation on the serial data bus between each of the output modules and the digital controller,
    wherein the digital controller further comprises circuitry configured to pull a bus logic state from high to low for generating data transmission to the plurality of isolated modules, and
    wherein each of the plurality of isolated modules further comprise circuitry configured to independently pull the bus logic state from high to low for generating data transmission to the digital controller.

10. The system of claim 9, further comprising one or more synchronous rectifiers coupled to the secondary side of each isolation transformer and effective to provide an isolated input voltage to an associated output module out of the plurality of output modules.

11. The system of claim 9, the galvanic isolation circuits further comprising first and second opto-isolators associated with each of the plurality of output modules.

12. The system of claim 9, the digital controller further comprising a digital power manager adapted to execute stored instructions to program operational parameters of the plurality of output modules via the serial data bus and to receive monitoring data from the plurality of output modules via the serial data bus.

13. The system of claim 12, the serial data bus further comprising a single-wire serial bus effective to provide synchronous data transmission between the digital power manager and the plurality of output modules.

14. The system of claim 13, the digital power manager further comprising an I²C user interface adapted for communication with a host system, wherein programming data and monitoring data may be transmitted between a host system and the plurality of output modules.

15. The system of claim 14, the plurality of output modules further comprising a plurality of isolated POL regulators effective to independently convey regulated power supply outputs to associated loads.

16. A modular power control system comprising:
  an open loop half-bridge power converter effective to convert a nominal input voltage into an intermediate bus voltage;
  a plurality of isolation transformers having primary sides coupled to receive the intermediate bus voltage and secondary sides galvanically isolated from the primary sides;
  a plurality of power output modules each coupled to receive an isolated voltage from one of the plurality of secondary sides of the isolation transformers and further comprising circuitry effective to convert the isolated voltage into an output voltage for conveyance to an independent load;
  a digital power manager coupled to each of the plurality of output modules via a serial data bus having a default high logic state; and
  a plurality of galvanic isolation circuits providing galvanic isolation on the serial data bus between each of the output modules and the digital controller,
  wherein the digital power manager further comprises circuitry effective to allow the digital power manager to pull the serial data bus low when the serial data bus is in a high logic state, and to prevent the digital power manager from pulling the serial data bus low when the serial data bus is in a low logic state generated by an output module, and
  wherein the plurality of output modules further comprise circuitry effective to allow an output module to pull the serial data bus low when the serial data bus is in a high logic state, and to prevent the output module from pulling the serial data bus low when the serial data bus is in a low logic state.

17. The system of claim 16, the plurality of galvanic isolation circuits further comprising a pair of opto-isolators associated with each of the plurality of output modules.

18. The system of claim 17, further comprising one or more synchronous rectifiers coupled to the secondary sides of each of the plurality of isolation transformers.

19. The system of claim 18, the power output modules effective to convert the isolated voltage into an output voltage for conveyance to an independent load based on control signals received from the digital power manager via the serial data bus.

20. The system of claim 19, the digital power manager further comprising a controller and stored instructions executable by the digital power manager to cause the controller to
  program operational parameters of the plurality of power output modules via the serial data bus and
  receive monitoring data from the plurality of power output modules via the serial data bus.

* * * * *